United States Patent
Ahn et al.

(10) Patent No.: US 9,786,962 B2
(45) Date of Patent: Oct. 10, 2017

(54) BATTERY PACK

(71) Applicant: SAMSUNG SDI CO., LTD., Yongin-si (KR)

(72) Inventors: Byung-Kook Ahn, Yongin-si (KR); Jae-Hyeok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 253 days.

(21) Appl. No.: 14/561,096

(22) Filed: Dec. 4, 2014

(65) Prior Publication Data

US 2015/0162650 A1    Jun. 11, 2015

(30) Foreign Application Priority Data

Dec. 5, 2013  (KR) .................. 10-2013-0150409

(51) Int. Cl.
    *H01M 10/48* (2006.01)
    *H01M 10/42* (2006.01)
    *H01M 2/10* (2006.01)

(52) U.S. Cl.
    CPC ....... *H01M 10/486* (2013.01); *H01M 2/1061* (2013.01); *H01M 10/425* (2013.01); *H01M 10/48* (2013.01); *H01M 2200/00* (2013.01)

(58) Field of Classification Search
    None
    See application file for complete search history.

(56) References Cited

U.S. PATENT DOCUMENTS

| | | |
|---|---|---|
| 2006/0269831 A1 | 11/2006 | Kim |
| 2013/0045401 A1 | 2/2013 | Yoon et al. |
| 2013/0122329 A1* | 5/2013 | Park .............. H01M 2/0207 429/7 |
| 2014/0065448 A1* | 3/2014 | Ahn ..................... H01M 2/02 429/7 |
| 2014/0147707 A1* | 5/2014 | Choi .............. H01M 10/04 429/7 |
| 2014/0220423 A1* | 8/2014 | Yi ................. H01M 2/0237 429/163 |
| 2014/0302380 A1* | 10/2014 | Song .............. H01M 2/30 429/158 |
| 2015/0037619 A1* | 2/2015 | Ahn .............. H01M 10/42 429/7 |

FOREIGN PATENT DOCUMENTS

| | | |
|---|---|---|
| KR | 2006-0112740 A | 11/2006 |
| KR | 2013-0034282 A | 4/2013 |
| KR | 2013-0048759 A | 5/2013 |

* cited by examiner

*Primary Examiner* — Scott J Chmielecki

(74) *Attorney, Agent, or Firm* — Knobbe, Martens, Olson & Bear, LLP

(57) ABSTRACT

A battery pack includes a plurality of battery cells, a protective circuit module (PCM), a temperature sensor and a case. Each battery cell has a terrace portion sealed so that an electrode tab of an electrode assembly is extracted to an outside. The PCM is electrically connected to the plurality of battery cells. The temperature sensor is connected to the PCM to measure a temperature of the battery cells. The case accommodates the plurality of battery cells, the PCM and the temperature sensor. The case includes a mounting portion on which the PCM is mounted, and a temperature sensor support portion protruded to be spaced apart from the mounting portion at a predetermined height is formed in one area of the mounting portion.

20 Claims, 5 Drawing Sheets

BATTERY PACK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2013-0150409, filed on Dec. 5, 2013, in the Korean Intellectual Property Office, the entire contents of which are incorporated herein by reference in their entirety.

BACKGROUND

Field

An aspect of the present invention relates to a battery pack, and more particularly, to a battery pack having improved safety.

Description of the Related Technology

As portable electronic devices become more compact and lightweight, many studies on secondary batteries that are used as driving power sources of the portable electronic devices have recently been conducted. Since the secondary batteries can be repetitively charged and discharged, secondary batteries are economical as compared with alternative batteries. In addition, the compact and large-capacity secondary batteries can be implemented. Since the secondary batteries have high operating voltage and high energy density per unit weight, secondary batteries are widely used in high-tech electronic device fields.

Generally, it is difficult to use only one battery cell as a power source in electronic devices such as personal computers and cellular phones, electric vehicles, electric tools, and the like. Accordingly, the power source employed in such a device is often configured as a battery module in which a plurality of battery cells are connected in series and/or parallel in order to obtain a desired voltage and capacity.

A protective circuit module (PCM) such as a charging/discharging control circuit and/or a protection circuit may be connected to such a battery module. At least one battery module having the PCM connected thereto is accommodated in an external case, thereby forming a battery pack.

SUMMARY OF CERTAIN INVENTIVE ASPECTS

Embodiments provide a battery pack in which, in a case accommodating a polymer cell and a protective circuit module (PCM), the height of an area in which a temperature sensor is positioned can be differently formed according to a thickness of the polymer cell.

According to an aspect of the present invention, there is provided a battery pack, including: a plurality of battery cells each configured to have a terrace portion sealed so that an electrode tab of an electrode assembly is extracted to an outside; a PCM electrically connected to the plurality of battery cells; a temperature sensor connected to the PCM to measure a temperature of at least one of the plurality of battery cells; and a case configured to accommodate the plurality of battery cells, the PCM and the temperature sensor, wherein the case includes a mounting portion on which the PCM is mounted, and a temperature sensor support portion protruded to be spaced apart from the mounting portion at a predetermined height is formed in one area of the mounting portion.

The temperature sensor support portion may be formed at a position corresponding to the terrace portion of the at least one battery cell.

The temperature sensor support portion may be formed to a height at which the top of the temperature sensor contacts the terrace portion of the battery cell.

The temperature sensor may be connected to the PCM by a cable, and the temperature sensor support portion may have a guide portion formed to surround the temperature sensor along the circumference of the temperature sensor support portion, except the area in which the cable is connected to the temperature sensor.

An extending portion extended to be inclined from the one area of the mounting portion to the temperature sensor support portion may be further formed to support the cable.

The plurality of battery cells may include first and second battery cells, and the mounting portion having the PCM mounted thereon may be positioned between the first and second battery cells.

The terrace portion of each of the first and second battery cells may be disposed toward the PCM.

The case may be formed to surround the circumference of the first battery cell, the second battery cell and the PCM positioned therebetween, and a pair of wide side surfaces of the first and second battery cells may be exposed.

The case may include an insulative material.

The plurality of battery cells may be pouch-type cells.

According to the present invention, in the case accommodating the polymer cell and the PCM, the height of an area in which the temperature sensor is positioned can be differently formed according to a thickness of the polymer cell. Accordingly, the present invention can be applied to various battery cells having different thicknesses.

Further, it is possible to improve the reliability of the contact between the temperature sensor and the battery cell. Accordingly, it is possible to sense an exact temperature of the battery cell, thereby improving the safety of the battery cell.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
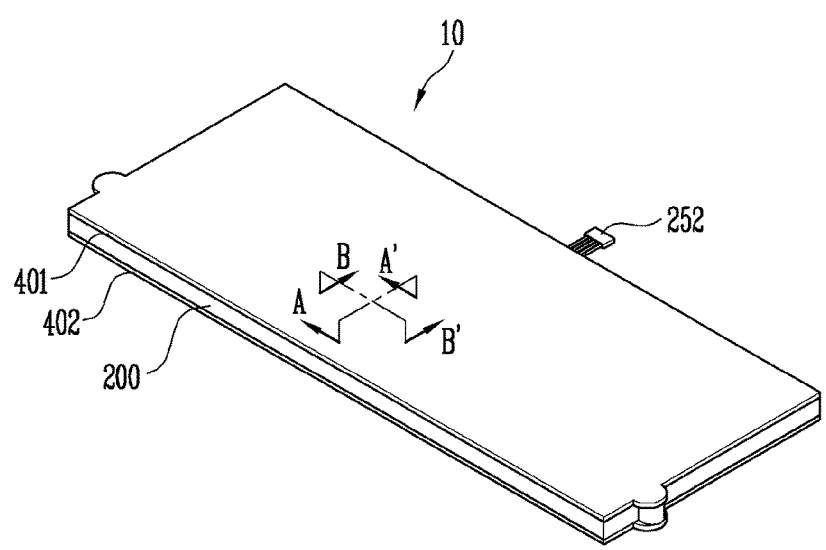
FIG. 1 is an assembled perspective view showing a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 2:
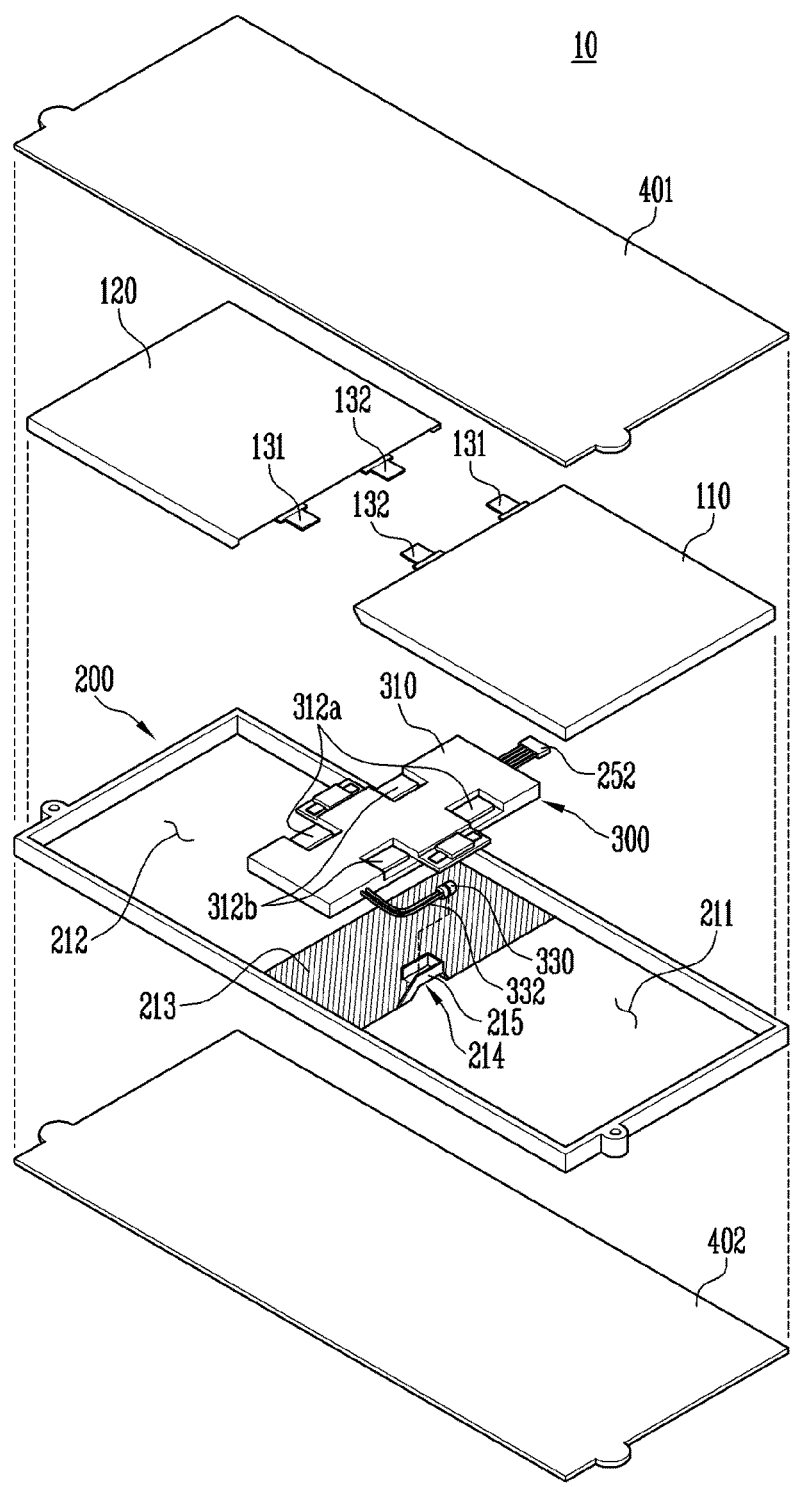
FIG. 2 is an exploded perspective view showing the battery pack of FIG. 1.
Figure 3:
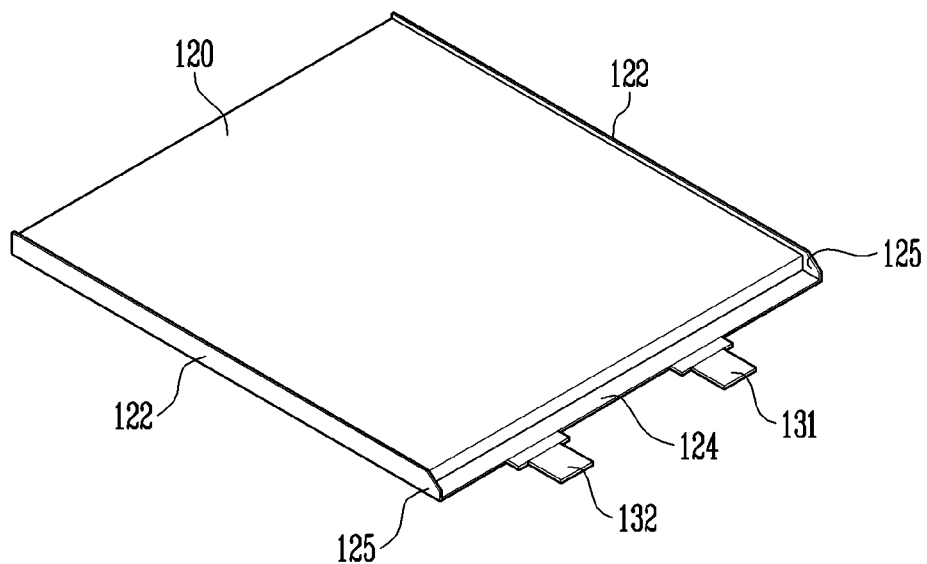
FIG. 3 is a perspective view showing a battery cell of FIG. 2.

FIG. 1 is an assembled perspective view showing a battery pack according to an embodiment of the present invention. FIG. 2 is an exploded perspective view showing the battery pack of FIG. 1. FIG. 3 is a perspective view showing a battery cell of FIG. 2.

Referring to FIGS. 1 to 3, the battery pack 10 according to this embodiment includes two battery cells 110 and 120, a protective circuit module (PCM) 300, a temperature sensor 330, and a case 200 for accommodating the two battery cells 110 and 120, the PCM 300 and the temperature sensor 330. The case 200 includes a mounting portion 213 on which the PCM 300 is mounted, and a temperature sensor support portion 214 is formed in one area of the mounting portion 213. Here, the temperature sensor support portion 214 is protruded to be spaced apart from the mounting portion 213 at a predetermined height.

The two battery cells 110 and 120 include a first battery cell 110 and a second battery cell 120. Each of the first and second battery cells 110 and 120 is formed in the shape of a pouch. The mounting portion 213 having the PCM 300 mounted thereon is positioned between the first and second battery cells 110 and 120, so that the PCM 300 is electrically connected to each of the first and second battery cells 110 and 120.

In addition, each of the first and second battery cells 110 and 120 has a terrace portion 124 sealed so that electrode tabs 131 and 132 of an electrode assembly accommodated in the pouch are extracted to the outside thereof. The terrace portion 124 of each of the first and second battery cells 110 and 120 is disposed toward the PCM 300.

The temperature sensor 330 is connected to one area of the PCM 300 by a cable 332, and measures a temperature of the first battery cell 110. That is, the temperature sensor 330 is necessarily mounted on the temperature sensor support portion 214 and then contacted with the terrace portion 124 of the first battery cell 110. To this end, the temperature sensor support portion 214 may be formed at a position corresponding to the terrace portion 124 of the first battery cell 110.

The temperature sensor support portion 214 has a guide portion 215 formed to surround the temperature sensor 330 along the circumference of the temperature sensor support portion 214, except the area in which the cable 332 is connected to the temperature sensor 330. In this case, the cable 332 may be formed of a flexible material. In addition, an extending portion 216 extended to be inclined from one area of the mounting portion 213 to the temperature sensor support portion 214 is further formed to support the cable 332.

Hereinafter, components of the battery pack 10 according to this embodiment will be described.

First, each of the first and second battery cells 110 and 120, as shown in FIG. 3, may include a pouch configured to seal an electrode assembly. The electrode assembly, for example, may be manufactured by stacking a positive electrode plate having a positive electrode active material coated thereon, a negative electrode plate having a negative electrode active material coated thereon, and a separator interposed between the positive and negative electrode plates, and then winding the stacked structure in a jelly-roll shape. Alternatively, the electrode assembly may be manufactured by sequentially stacking a positive electrode plate, a separator and a negative electrode plate in plural times.

The pouch-type battery cell 120 is formed by sealing the electrode assembly with the pouch, and may include a pair of side wing portion 122 formed by fusion-bonding the pouch, and a terrace portion 124 that is an area in which electrode tabs 131 and 132 are extracted.

More specifically, the electrode assembly is accommodated in an accommodating portion (not shown) having an accommodation space in which the electrode assembly can be accommodated. Then, a cover portion (not shown) having one side continuously formed with the accommodating portion is folded on the accommodating portion. Subsequently, the accommodating portion and the cover portion are fusion-bonded at an edge of the accommodation space. Accordingly, the electrode assembly is sealed, and the pair of side wing portions 122 and the terrace portion 124 are formed at the edge where the accommodating portion and the cover portion are bonded.

The pair of side wing portions 122 are bent in parallel to side surfaces of the first or second battery cell 110 or 120. Alternatively, the pair of side wing portions 122 may be bent to come in contact with the respective side surfaces of the first or second battery cell 110 or 120. As shown, the pair of bent side wing portions 122 are extended up to the terrace portion 124. The pair of side wing portions 122 include extending portions 125 bent on the terrace portion 124.

The extending portion 125 may be bent perpendicular to the terrace portion 124 on the terrace portion 124. Accordingly, the pair of side wing portions 122 continuously formed with the extending portions 125 can also be bent perpendicular to the terrace portion 124. The extending portion 125 may be formed to be inclined along the length direction thereof.

Further, first and second electrode tabs 131 and 132 are attached to the electrode assembly. The first and second electrode tabs 131 and 132 are extracted to an outside through the terrace portion 124, to be electrically connected to the PCM 300.

The first and second battery cells 110 and 120 may have, for example, a quadrangular outline, and the case 200 accommodating the first and second battery cells 110 and 120 may have a rectangular shape. Although it has been described in this embodiment that the battery pack 10 includes the first and second battery cells 110 and 120, the present invention is not limited thereto. That is, the battery pack 10 may include one battery cell or include three or more battery cells.

Further, when the first and second battery cells 110 and 120 are provided in the battery pack 10 as shown in FIG. 2, the electrode tabs 131 and 132 provided to the first battery cell 110 may be respectively disposed opposite to those provided to the second battery cell 120. The PCM 300 may be positioned between the first and second battery cells 110 and 120.

The case 200 surrounds the circumference of the first battery cell 110, the second battery cell 120 and the PCM 300, and has a mounting portion 213 on which the PCM 300 is mounted. In addition, the case 200 has first and second accommodating portions 211 and 212 for respectively accommodating the first and second battery cells 110 and 120. Here, the first and second battery cells 110 and 120 are respectively positioned in the first and second accommodating portions 211 and 212 so that wide front surfaces of the first and second battery cells 110 and 120 are exposed.

A temperature sensor support portion 214 having the temperature sensor 330 mounted thereon may be formed in one area of the mounting portion 213 on which the PCM 300 is mounted. A guide portion 215 is formed at the circumference of the temperature sensor support portion 214, and accordingly, it is possible to prevent or inhibit the temperature sensor 330 from being separated from the temperature sensor support portion 214, thereby improving the mountability of the temperature sensor 330. The temperature sensor 330 is protected by being disposed in an independent space, so that it is possible to prevent damage of the temperature sensor 330.

The case 200 may be formed of an insulative material, e.g., a thermoplastic polymer resin. The case 200 may be manufactured using a material having elasticity to reduce impact when the battery pack 10 is dropped.

The PCM 300 is mounted on the mounting portion 230 of the case 200. The PCM 300 is electrically connected to the first and second battery cells 110 and 120. As an embodiment, the first and second electrode tabs 131 and 132 of each of the first and second battery cells 110 and 120 are respectively welded to connection portions 312a and 312b of the PCM 300, so that PCM 300 can be electrically connected to the first and second battery cells 110 and 120.

Meanwhile, the PCM 300 includes a temperature protection device (not shown) mounted on a board 310, so that it is possible to prevent or inhibit overheating and explosion, caused by overcharging, overdischarging or overcurrent of the first and second battery cells 110 and 120. The temperature protection device is a device which allows conduction and insulation to be reversible depending on temperature. The temperature protection device can prevent firing or explosion of the battery pack 10, caused by overcurrent. The temperature protection device may be a polymer PTC obtained by dispersing conductive particles such as metal or carbon particles into a crystalline polymer, but the present invention is not limited thereto.

The temperature sensor 330 may be connected to the PCM 300 through the cable 332. The temperature sensor 330 generates temperature information of a measurement position as an electrical signal and provides the generated temperature information to the PCM 300. For example, the temperature sensor 330 may be a thermistor. More specifically, the thermistor generates an electrical signal corresponding to a temperature of an object to be measured, and may be a resistive thermistor of which the electrical resistance is changed depending on temperature.

The temperature sensor 330 may be disposed in parallel to the PCM 300 along the length direction of the PCM 300. The temperature sensor 330 may be disposed adjacent to at least one of both sides of the PCM 300. Although it has been illustrated in FIG. 2 that the temperature sensor 330 is provided at the right side of the PCM 300 to measure a temperature of the first battery cell 110, the present invention is not limited thereto. That is, the temperature sensor 330 may be provided at the left side of the PCM 300.

The temperature sensor 330 monitors a change in temperature of the first battery cell 110, and the PCM 300 may control the charging/discharging of the first and second battery cells 110 and 120, based on the monitored result. To this end, the electrical signal generated in the temperature sensor 330 may be provided to the PCM 300 by the cable 332 which connects the temperature sensor 330 and the PCM 300 to each other.

Labels 401 and 402 may be respectively attached to outsides of the case 200 which accommodates the first battery cell 110, the second battery cell 120 and the PCM 300 having the temperature sensor 330 while surrounding their outsides.

A connector 252 connected to a side of the PCM 300 is used to facilitate the connection between a plurality of cables and an external electronic device. Cables (no reference numeral) connected to the connector 252 are connected to a positive electrode terminal (not shown) and a negative electrode terminal (not shown), formed on the PCM, and may be electrically connected to an external device (e.g., a notebook computer, a tablet PC, a charger, etc.). Some of the cables may be connected to a ground (not shown).

Figure 4:
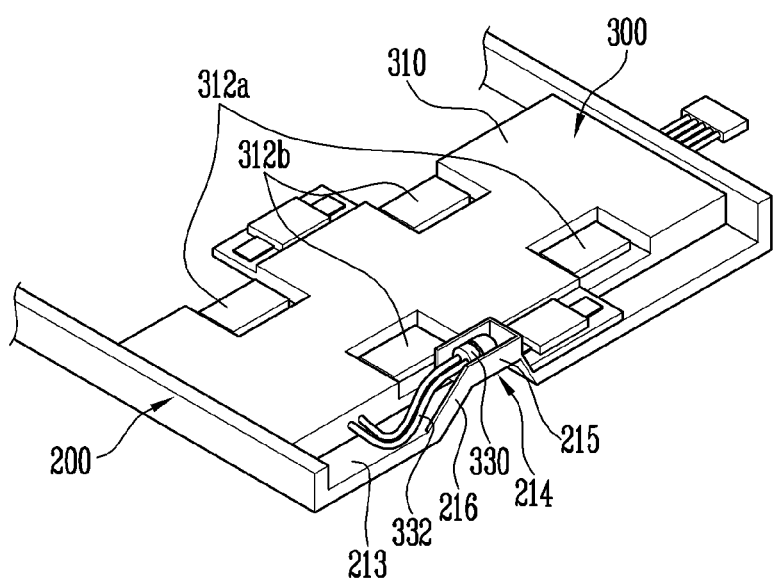
FIG. 4 is a perspective view showing a mounting portion according to the embodiment of the present invention.
Figure 5:
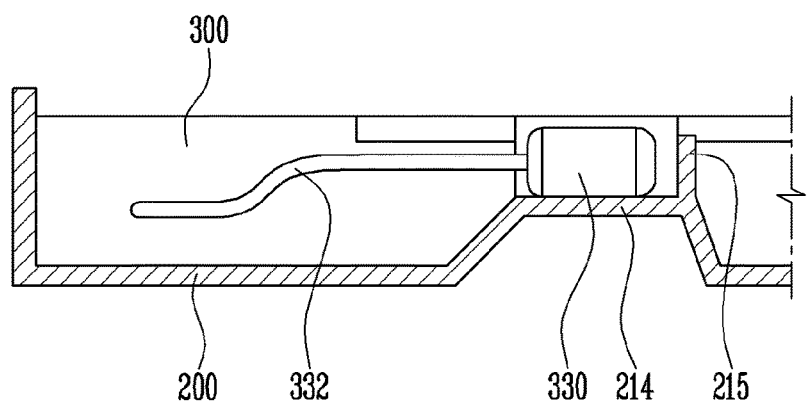
FIG. 5 is a sectional view taken along line A-A' of FIG. 1.

FIG. 4 is a perspective view showing the mounting portion according to the embodiment of the present invention. FIG. 5 is a sectional view taken along line A-A' of FIG. 1.

Referring to FIGS. 4 and 5, the mounting portion 213, on which the PCM 300 electrically connected to the plurality of battery cells 110 and 120 (see FIG. 2) is mounted, is formed in the case 200. A temperature sensor support portion 214, at which the temperature sensor 330 connected to the PCM 300 is positioned, is formed in one area of the mounting portion 213, i.e., an area in which the terrace portion of the first battery cell 110 is positioned. Although it has been described in this embodiment that the temperature sensor support portion 214 is formed at the side of the first battery cell 110, the present invention is not limited thereto. That is, the temperature sensor support portion 214 may be positioned at the side of the second battery cell 120 or at any other location.

In this case, the temperature sensor 330 monitors a change in temperature of the first battery cell 110, and the PCM 300 may control the charging/discharging of the first and second battery cells 110 and 120, based on the monitored result. To this end, the electrical signal generated in the temperature sensor 330 may be provided to the PCM 300 by the cable 332 which connects the temperature sensor 330 and the PCM 300 to each other.

The temperature sensor support portion 214 having the temperature sensor 330 mounted thereon is protruded to be spaced apart from the bottom surface of the mounting portion 213 at a predetermined height. In this case, the temperature sensor support portion 214 is formed to a height at which the top of the temperature sensor 330 can be contacted with the terrace portion of the first battery cell 110 in a state in which the temperature sensor 330 is mounted. Accordingly, the temperature sensor 330 is contacted with the terrace portion of the first battery cell 110, so that it is possible to improve the reliability of a value measured in the temperature sensor 330.

The temperature sensor support portion 214 has a guide portion 215 formed to surround the temperature sensor 330 along the circumference of the temperature sensor support portion 214, except the area in which the cable 332 is connected to the temperature sensor 330. Accordingly, it is possible to prevent the temperature sensor 330 from being separated from the temperature sensor support portion 214. In addition, an extending portion 216 extended to be inclined from one area of the mounting portion 213 to the temperature sensor support portion 214 is further formed to support the cable 332. Here, the cable 332 may be formed of a flexible material.

Figure 6A:
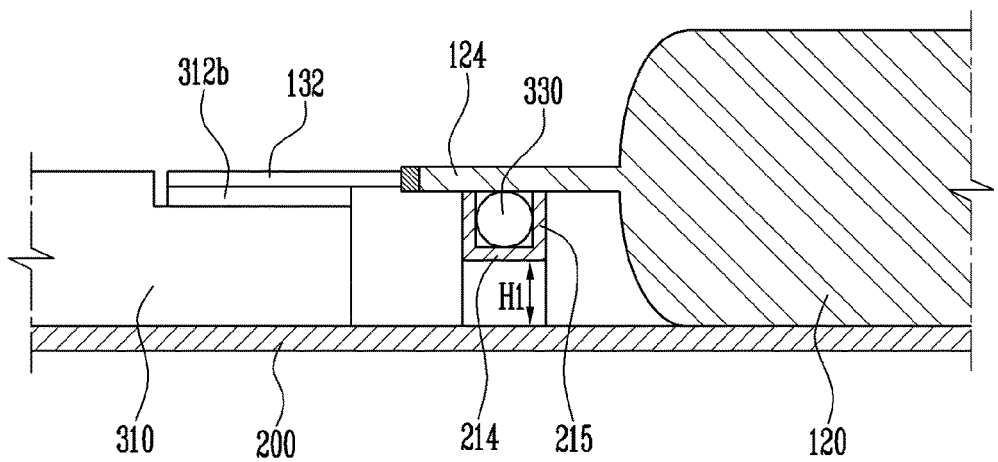
FIG. 6A is a sectional view taken along line B-B' of FIG. 1 according to an embodiment of the present invention.
Figure 6B:
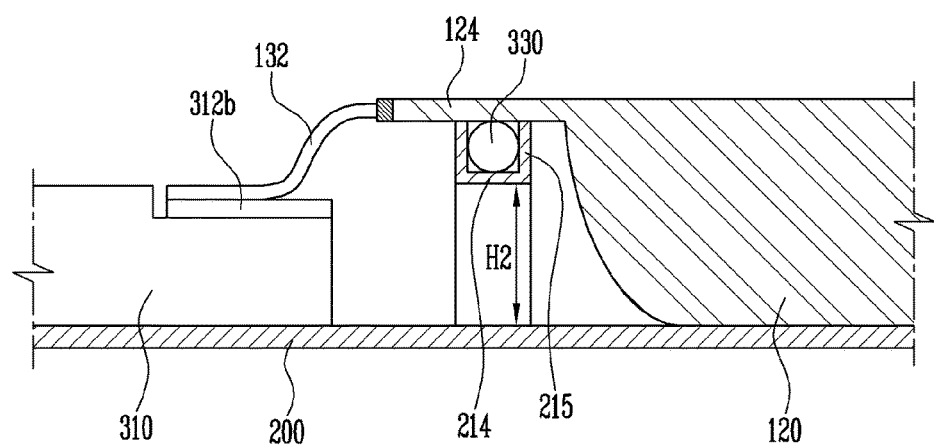
FIG. 6B is a sectional view taken along line B-B' of FIG. 1 according to another embodiment of the present invention.

FIG. 6A is a sectional view taken along line B-B' of FIG. 1 according to an embodiment of the present invention. FIG. 6B is a sectional view taken along line B-B' of FIG. 1 according to another embodiment of the present invention.

Referring to FIG. 6A, the second electrode tab 132 of the second battery cell 120 is extracted to a middle area in the thickness direction of the second battery cell 120. Accordingly, the terrace portion 124 is also positioned in the middle area in the thickness direction of the second battery cell 120.

Referring to FIG. 6B, the second electrode tab 132 of the second battery cell 120 is extracted to a top in the thickness direction of the second battery cell 120. Accordingly, the terrace portion 124 is also positioned at the top in the thickness direction of the second battery cell 120.

That is, the height H1 of the temperature sensor support portion 214 of FIG. 6A is formed at a position lower than the height H2 of the temperature sensor support portion 214 of FIG. 6B so that the temperature sensor 330 is contacted with the terrace portion 124 of the second battery cell 120. In other words, the temperature sensor support portion 214 may be formed to a height corresponding to that of the terrace portion 124 of the second battery cell 120.

As described above, according to the present invention, the height of the temperature sensor support portion 214 is differently formed according to an extraction position of the electrode tab. Accordingly, the present invention can be applied to various battery cells having different heights at which an electrode tab is extracted, thereby exactly measuring the temperature of the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of battery cells each configured to have a terrace portion sealed so that an electrode tab of an electrode assembly is extracted to outside the case;
a protective circuit module (PCM) having upper and lower surfaces electrically connected to the plurality of battery cells;
a temperature sensor connected to the PCM to measure a temperature of at least one of the plurality of battery cells; and
a case configured to accommodate the plurality of battery cells, the PCM and the temperature sensor,
wherein the case includes a mounting portion having a upper surface on which the PCM is mounted such that the lower surface of the PCM is in contact with upper surface of the mounting portion, and a temperature sensor support portion protruded to define a support surface that is spaced apart from the upper surface of the mounting portion at a predetermined height formed in one area of the upper surface of the mounting portion wherein the temperature sensor is positioned on the support surface of the mounting portion so as to be positioned above the lower surface of the PCM positioned on the upper surface of the mounting portion at the predetermined height from the mounting portion.

2. The battery pack of claim 1, wherein the temperature sensor support portion is formed at a position corresponding to the terrace portion of the at least one of the plurality of battery cells.

3. The battery pack of claim 1, wherein the temperature sensor support portion is formed to a height at which the top of the temperature sensor contacts the terrace portion of the battery cell.

4. The battery pack of claim 1, wherein the temperature sensor is connected to the PCM by a cable, and the temperature sensor support portion has a guide portion formed to surround the temperature sensor along the circumference of the temperature sensor support portion, except the area in which the cable is connected to the temperature sensor.

5. The battery pack of claim 4, wherein the cable is formed of a flexible material.

6. The battery pack of claim 4, wherein an extending portion extended to be inclined from the one area of the mounting portion to the temperature sensor support portion is further formed to support the cable.

7. The battery pack of claim 1, wherein the plurality of battery cells include first and second battery cells, and the mounting portion having the PCM mounted thereon is positioned between the first and second battery cells.

8. The battery pack of claim 7, wherein the terrace portion of each of the first and second battery cells is disposed toward the PCM.

9. The battery pack of claim 7, wherein the case is formed to surround the circumference of the first battery cell, the second battery cell and the PCM positioned therebetween, and a pair of wide side surfaces of the first and second battery cells are exposed.

10. The battery pack of claim 1, wherein the case includes an insulative material.

11. The battery pack of claim 1, wherein the plurality of battery cells are pouch-type cells.

12. A battery pack comprising:
at least one battery cell that has a terraced portion with an electrode assembly extending out of the battery cell adjacent the terrace portion;
a protective circuit module (PCM) electrically connected to the at least one battery cell adjacent the terrace portion of the at least one battery cell;
a temperature sensor connected to the PCM;
a case that receives the at least one battery cell and the PCM having an upper and lower surface and the temperature sensor, wherein the case defines a mounting portion that has an upper surface that receives the PCM such that the lower surface of the PCM is in contact with the upper surface of the mounting portion wherein the mounting portion defines a temperature sensor support portion having a support surface that is formed to receive the temperature sensor so that the temperature sensor is positioned on the support surface and is spaced apart from the lower surface of the PCM positioned on the upper surface of the mounting portion at a first height and so as to extend to be adjacent the terraced portion of the at least one battery cell.

13. The battery pack of claim 12, wherein the at least one battery cell comprises a plurality of battery cells.

14. The battery pack of claim 12, wherein the mounting portion defines a substantially planar area with the temperature sensor support portion comprising a raised portion that extends outward of the mounting portion.

15. The battery pack of claim 14, wherein the temperature sensor support portion defines a recess that receives the temperature sensor.

16. The battery pack of claim 15, wherein the temperature sensor support portion includes an inclined surface and wherein the temperature sensor includes a flexible cable that interconnects the temperature sensor to the PCM and wherein the flexible cable is positioned on the inclined surface.

17. The battery pack of claim 12, wherein the at least one battery cell includes a first and second battery cell and the mounting portion having the PCM mounted thereon is interposed between the first and second battery cells.

18. The battery pack of claim 12, wherein the battery cell has a wall that extends in the direction of the temperature sensor support portion and wherein the terraced portion extends outward from the wall between a top and bottom surface of the battery cell and wherein the temperature sensor support portion is sized so that the temperature sensor is positioned adjacent the terraced portion so as to be interposed between the terraced portion and the mounting portion of the case.

19. The battery pack of claim 12, wherein the battery cell has a wall that extends in the direction of the temperature sensor support portion and wherein the terraced portion extends outward from the wall adjacent a top surface of the battery cell and wherein the temperature sensor support portion is sized so that the temperature sensor is positioned adjacent the terraced portion so as to be interposed between the terraced portion and the mounting portion of the case.

20. The battery pack of claim 12, wherein the case is formed to surround an outer perimeter of the at least one battery cell and the PCM so that a wide side surface of the at least one battery cell is exposed.

* * * * *